US008287332B2

(12) United States Patent
Mayfield

(10) Patent No.: US 8,287,332 B2
(45) Date of Patent: Oct. 16, 2012

(54) METHOD AND APPARATUS FOR MACHINING WORKPIECES

(76) Inventor: John Mayfield, Ambarvale (AU)

( * ) Notice: Subject to any disclaimer, the term of this patent is extended or adjusted under 35 U.S.C. 154(b) by 1090 days.

(21) Appl. No.: 11/946,669

(22) Filed: Nov. 28, 2007

(65) Prior Publication Data

US 2008/0134485 A1    Jun. 12, 2008

(30) Foreign Application Priority Data

Nov. 28, 2006    (AU) ................................ 2006243883

(51) Int. Cl.
*B24B 1/00*    (2006.01)
(52) U.S. Cl. ........... 451/45; 451/141; 451/234; 451/248
(58) Field of Classification Search ................ 451/28, 451/45, 126, 141, 234, 235, 248, 367, 371, 451/397
See application file for complete search history.

(56) References Cited

U.S. PATENT DOCUMENTS

| | | | | |
|---|---|---|---|---|
| 1,330,981 A | * | 2/1920 | Donner | 451/216 |
| 1,937,408 A | * | 11/1933 | Johnson | 409/211 |
| 3,045,398 A | | 7/1962 | McEwan | |
| 3,600,859 A | | 8/1971 | Edgecomb | |
| 3,998,127 A | * | 12/1976 | Romeu | 409/225 |
| 4,148,158 A | * | 4/1979 | Hewitt | 451/141 |
| 5,688,084 A | * | 11/1997 | Fritz et al. | 409/202 |
| 5,725,415 A | * | 3/1998 | Bernhard | 451/45 |
| 5,738,564 A | * | 4/1998 | Helle et al. | 451/11 |
| 5,911,888 A | * | 6/1999 | Girardin | 219/69.11 |
| 6,010,394 A | * | 1/2000 | Dieck et al. | 451/141 |
| 6,454,636 B1 | * | 9/2002 | Iwabuchi | 451/53 |
| 6,719,506 B2 | * | 4/2004 | Chang et al. | 409/201 |
| 6,740,839 B1 | * | 5/2004 | Kung et al. | 219/69.11 |
| 6,758,730 B1 | * | 7/2004 | Bernhard | 451/349 |
| 6,786,806 B2 | * | 9/2004 | Maus, Jr. | 451/141 |
| 7,128,507 B2 | * | 10/2006 | Hiramoto et al. | 409/202 |
| 7,462,144 B2 | * | 12/2008 | Braun | 483/56 |

FOREIGN PATENT DOCUMENTS

| | | |
|---|---|---|
| EP | 0673713 | 9/1995 |
| GB | 2264246 | 8/1993 |
| WO | WO2007/092897 | 8/2007 |

OTHER PUBLICATIONS

United Kingdom Intellectual Property Office Search Report for Application No. GB0723274.7 (dated Mar. 27, 2008).

* cited by examiner

*Primary Examiner* — Eileen P. Morgan
(74) *Attorney, Agent, or Firm* — Marshall, Gerstein & Borun LLP

(57) ABSTRACT

An apparatus is provided for machining workpieces that, when in use, functionally cooperate with each other. The apparatus includes a frame for mounting each of the workpieces, and a machining tool mountable to the frame such that the tool is capable of defined relative movement with respect to the frame. The frame includes one or more adjustable supports for adjusting the position of the workpieces relative to the frame for operative engagement between the tool and the workpieces. The adjustable supports are fixable to maintain the position of one of the workpieces relative to the frame for machining in accordance with the defined relative movement, and the apparatus is adapted to permit the workpiece to be removed and replaced with one of the other workpieces, for machining in accordance with the defined relative movement. A method is also provided.

12 Claims, 5 Drawing Sheets

METHOD AND APPARATUS FOR MACHINING WORKPIECES

FIELD OF THE INVENTION

The present invention relates to machining the components of a device which need to functionally cooperate with each other during operation.

BACKGROUND OF THE INVENTION

Any discussion of the prior art throughout the specification should in no way be considered as an admission that such prior art is widely known or forms part of common general knowledge in the field.

The various components of a device will often require some type of machining for optimum performance. The fine tolerances between the adjacent moving parts usually demand a high level of precision and accuracy during the machining processes. This is particularly true of tractor mounted, helical blade, lawn mowing assemblies and for convenience the present invention will be described with particular reference to this application. However, it will be appreciated that this is purely illustrative and in no way restrictive on the scope and application of the invention.

The grass on the fairways and greens of golf courses is often cut using a type of tractor mounted lawn mower. The mower has one or more elongate cylindrical reels formed by helically wound cutting blades. The reel assembly further includes a bedknife that has a blade that is parallel to the axis of the cylinder and positioned closely adjacent to its outer surface. The reel assembly is lowered so that the edge of the bedknife is at the required mowing height. As the reel is spun about its axis, the cutting edges of each helical blade move past the cutting edge of the bedknife at an angle. Blades of grass caught between the two are cleanly cut with a scissor action.

It is preferable to cut the grass using a clean scissor action rather than the tearing or shearing action from the blades of a flat disc style mower, because the resultant cut blade of grass has much less damage to its cellular structure. By minimising the cellular damage to the cut blades of grass, the risk of fungal infection is also minimised as there is less surface area exposed to spore germination, that is, amputation compared to crushing. Furthermore, less water is required to replace the moisture lost by transpiration from the bleeding tip of the blade and there is less "browning" or dead spots in the grass. This helps to provide a "true" playing or putting surface.

As the helical blades on the mower reel assemblies become worn, the gap between the cutting edge of the helical blade and the cutting edge of the bedknife starts to increase such that the grass tends to be cut less by a scissor action and more by a tearing or shearing action. The increased cellular damage associated with this brings with it the disadvantages discussed above. Therefore, there is a need to regularly sharpen and re-tune the cylindrical reel in relation to the bedknife.

One method commonly used by golf courses is known as "back lapping". Using an abrasive lapping paste, the bedknife is tightened against the helical blades and then the reel is rotated so that the cutting edge of the knife and the blades are worn into each other. This requires the bedknife to be positioned firmly against the rotating blades which causes a braking effect on the reel. This increases engine wear, fuel consumption and deterioration of the cylinder bearings. With increased bearing wear comes an ever increasing rate of damage to the rotating blades.

Another commonly used method is to cylindrically grind the reel. This involves spinning the blades against a curved grinding surface that corresponds to the cylindrical surface of the reel. However, this still produces a large area of contact between the helical cutting blades and the cutting edge of the bedknife. Therefore, the excessive braking effect and its disadvantages still exist.

In light of this, it has been recognised that the helical blades require a cutting edge backed by a relief angle to cleanly cut the grass blades. When properly tuned to the bedknife, the cylinder can spin freely thereby minimising the wear and tear caused by the friction loads. To machine the required relief angle while tuning the helical blades to the bedknife requires high levels of precision. This demands large expensive grinding equipment of the type that is permanently mounted to the workshop floor. The substantial grinding equipment is necessary in order to keep any deflections in the freshly machined cutting edges within the required tolerances. Excessive deflections in the helical blades or the bedknife will result in contact that causes the braking effect or an unacceptable gap that tears rather than cuts. Only the wealthiest of golf clubs can afford to install such equipment and therefore it is common to find that the reel assemblies are transported to remote workshops for sharpening. This provides the required relief angle but has many time and cost disadvantages when compared to back lapping and cylindrical grinding.

It has been found that frequently the bedknife support, which mounts to bedknife to the reel, is not in parallel alignment with the bedknife. Consequently, the bedknife support may interfere with the scissor action between the helical blades and the bedknife, and thus also needs to be realigned and re-tuned in relation to the reel and the bedknife.

SUMMARY OF THE INVENTION

It is an object of the present invention to overcome or ameliorate at least one of the disadvantages of the prior art, or to provide a useful alternative.

According to a first aspect, the present invention provides an apparatus for machining workpieces that, when in use, functionally cooperate with each other, the apparatus including:
  a frame for mounting each of the workpieces, and
  a machining tool mountable to the frame such that the tool is capable of defined relative movement with respect to the frame;
  the frame including one or more adjustable supports for adjusting the position of the workpieces relative to the frame for operative engagement between the tool and the workpieces; wherein
  the adjustable supports are fixable to maintain the position of one of the workpieces relative to the frame for machining in accordance with the defined relative movement, and the apparatus is adapted to permit the workpiece to be removed and replaced with one of the other workpieces, for machining in accordance with the defined relative movement.

According to a second aspect, the present invention provides a method of machining workpieces that, when in use, functionally cooperate with each other, the method including:
  mounting one of the workpieces on a frame;
  mounting a machining tool on the frame to permit defined relative movement between the tool and the frame;
  adjusting the position of the workpiece relative to the frame with one or more adjustable supports for the machine tool to operatively engage the workpiece;
  fixing the adjustable supports to maintain the position of said workpiece relative to the frame;

operatively engaging the tool and the workpiece and machining the workpiece in accordance with the defined relative movement, and removing the workpiece from the frame and sequentially mounting the remaining workpieces for machining in accordance with the defined relative movement.

By keeping the machine tool path constant for each successive machining operation rather than maintaining the machine tool path within fine tolerances, the present invention allows for relatively inexpensive and portable equipment to machine interacting mechanical components such that their mating surfaces precisely match each other. In terms of the lawn mower reel assembly, a relief angle can be machined on to the cutting edge of each helical blade without being overly concerned about any deviations in the movement of the grinding disc along the cutting edge of the blade because the same deviations will exist in the cutting edge of the bedknife and therefore the two cutting edges will be precisely matched to each other.

Preferably, the adjustable supports are fixable to maintain their respective positions to enable replacement of the workpiece with one of the other workpieces. It is preferable that the adjustable supports are adapted for replaceable securing to the frame and providing mounting points for each of the workpieces. Preferably, each adjustable support includes at least two mutually co-operable members, said co-operable members being engageable to permit relative movement with respect to each other. Preferably, the mutually co-operable members are telescopically engageable.

Preferably, the mutually co-operable members are telescopically engageable for slidable movement with respect to each other. Preferably, each adjustable support includes a locking member for releasably locking the at least two co-operable members.

In a preferred form, the frame includes a track and a tool carriage, the tool carriage being adapted to secure the tool and travel along the track as the tool follows the defined relative movement between the tool and the workpiece.

In some embodiments, the frame has two longitudinally extending spaced apart side members, the side members being horizontally adjacent one another such that the workpieces can be mounted to the frame so that the operative engagement between the tool and the workpiece occurs along the centre line between the two side members. By machining along the longitudinal centre line of the frame, the deflections caused by any twist or warping in the frame are minimised. Preferably, the side members define the track for the tool carriage.

In some embodiments of the invention, the machine tool is a disc grinder. In a particularly preferred embodiment, the workpieces are components of a helical blade mower reel assembly. In these embodiments, one of the workpieces is an elongate cylinder with a series of helically wound cutting blades and a bedknife support, and one of the other of the workpieces is a bedknife for functionally cooperating with the helically wound blades to cut grass. In a further preferred form, the disc grinder machines a relief angle into the back of the helically wound cutting blades and the track is configured such that the disc grinder can machine substantially the entire length of the bedknife and the helically wound blades.

In this form of the invention, it is preferable that the tool carriage is adapted to secure the tool in two or more different orientations so that it can be used to machine the cylinder, the bedknife support and the bedknife. Preferably, in a first of said orientations, the tool is capable of machining the helical blades of the reel. Preferably, in a second of said orientations, the tool is capable of machining the bedknife support. Preferably, at least two of said orientations are at 90° to each other. Preferably, said first and said second orientations are at 90° to each other.

Preferably, the apparatus further includes a support member for the bedknife that is mountable to the adjustable supports. Preferably, the support member is mountable so that the bedknife is displaced relative to the frame at the same distance as the distance between the frame and the cylinder for machining in accordance with the defined relative movement.

In some embodiments, the helically wound blades are mounted to the periphery of a series of discs fixed to an axle. Preferably, the frame includes a positioning finger for positioning each of the helically wound blades prior to operative engagement with the grinding disc. It is also preferable to provide a safety catch which prevents contact between the grinding disc and any of the other blades during the machining of one of the blades. The apparatus may further include biasing means for engaging the axle and urging the helically wound blade against the positioning finger during the machining operation. In one convenient form, the biasing means is a weighted lever arm that is ratcheted and connected to the axle by means of a connector piece.

Preferred embodiments also provide the frame with a removable tool carriage abutment on the track which can be selectively positioned to limit the travel of the tool carriage along the track in order to prevent inadvertent disengagement of the grinding disc and the helically wound blade. In these embodiments, the abutment may be selectively moved to a retracted position to allow the grinding disc to disengage the helically wound reel such that the reel can be indexed to the next helically wound blade on the reel.

BRIEF DESCRIPTION OF THE DRAWINGS

Preferred embodiments of the invention will now be described, by way of example only, with reference to the accompanying drawings in which.

DETAILS DESCRIPTION OF PREFERRED EMBODIMENT

Figure 1:
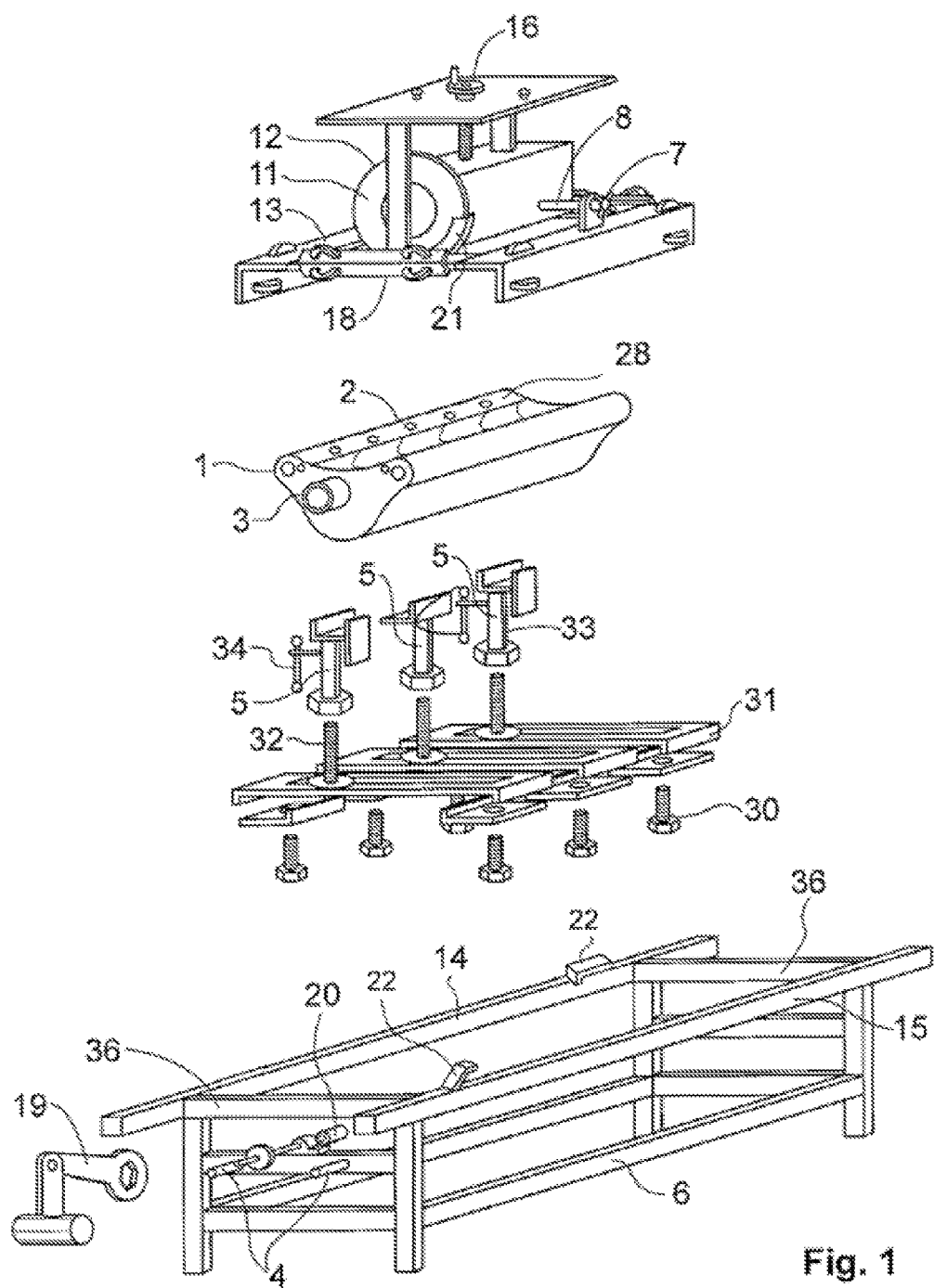
FIG. 1 shows an exploded perspective view of an apparatus according to one embodiment of the present invention configured for machining the helically wound blades of a mower reel assembly.

FIG. 1 shows an exploded perspective view of an apparatus according to the first aspect of the present invention specifically configured for machining the cylindrical reel of a tractor mounted helical blade mower assembly. The elongate cylindrical reel 1 is formed by series of helically wound cutting blades 2 mounted on the reel axle 3. The reel 1 is housed within a protective shroud that leaves only small portion of the reel exposed for cutting grass.

The reel and shroud, with the bedknife removed, are placed upside down on adjustable reel support columns 5 which are releasably secured to a mounting frame 6. The grinder 12 is mounted on a tool carriage 13, which is in turn is mounted directly onto the mounting frame 6. The side rails 14 and 15 of the frame 6 define a track for the tool carriage 13 to slide along in a defined relative movement with respect to the frame 6. An adjustment screw 16 controls the depth of the cut of the grinder 12. The grinding wheel 11 is locked into a mid-position between the side rails 14 and 15 by a locking screw 7 and distance piece 8.

The first of the cutting blades 2 is initially positioned for machining by rotating it into abutment with positioning finger 18. The relief angle is altered by moving the positioning finger 18 relative to the centreline of the workpiece and the grinding disc.

The ratcheted weighted lever arm 19 is connected to the reel axle 3 by means of a connector 20 in order to apply a biasing torque keeping the blade 2 in contact with the positioning finger 18.

In the apparatus, the tool carriage 13 is configured to permit the grinder 12 to adopt a number of different orientations in order to accommodate both the helical blades 2 of the reel 1 as well as the bedknife 24. In addition, the grinder 12 is able to grind both the helically wound blades 2 and the bedknife support 28 by being indexed into two orientations at 90° to each other, without having to remove the reel assembly. The grinder 12 is rotatable within the plane of the tool carriage 13 about a perpendicular axis of the tool carriage 13 into these indexed orientations to respectively sharpen the blades 2 and subsequently the bedknife support 28 and the bedknife 24.

The adjustable supports 5 adjust the position of the reel assembly 1 relative to the frame 6 for operative engagement between the grinder 12 and the reel assembly 1. The adjustable supports 5 include foot members 31 for releasably securing the adjustable supports to the frame 6 by screws 30. Each adjustable support 5 includes two shafts 32 and 33 in telescopically mounted for relative movement with respect to each other, and a manually operable locking member in the form of a locking screw (not shown). A reel locking member 34 is also provided to clamp the reel 1 to each adjustable support 5. The shafts 32 and 33 have complementary mating screw threads to permit relative movement, although in other embodiments the shafts 32 and 33 do not have screw threads but are in telescopically slideable engagement.

In operation, the reel and shroud are placed upside down on the adjustable supports 5. The shafts 32 and 33 are moved relative to each other to permit the adjustable supports 5 to vary the position of the reel 1 relative to the frame 6. The locking members are then actuated to fix the adjustable supports 5 in place, and the reel locking members 34 fix the reel 1 in place on the supports 5, thus maintaining the position of the reel 1 relative to the frame 6 for machining of the blades 2 by the grinder 12 along the defined relative movement.

After fixing the adjustable supports 5, the first of the cutting blades is initially positioned for machining by rotating the blade 2 into abutment with positioning finger 18. The grinder 12 is then mounted on the tool carriage 13. The relief angle is altered by moving the positioning finger 18 relative to the centre line of the workpiece and the grinder 12. The ratcheted weight 19 is connected to the rear axle 3 by a connector 20 to apply a biasing torque so as to keep the blade 2 in contact with the positioning finger 18 during the grinding operation.

Figure 2:
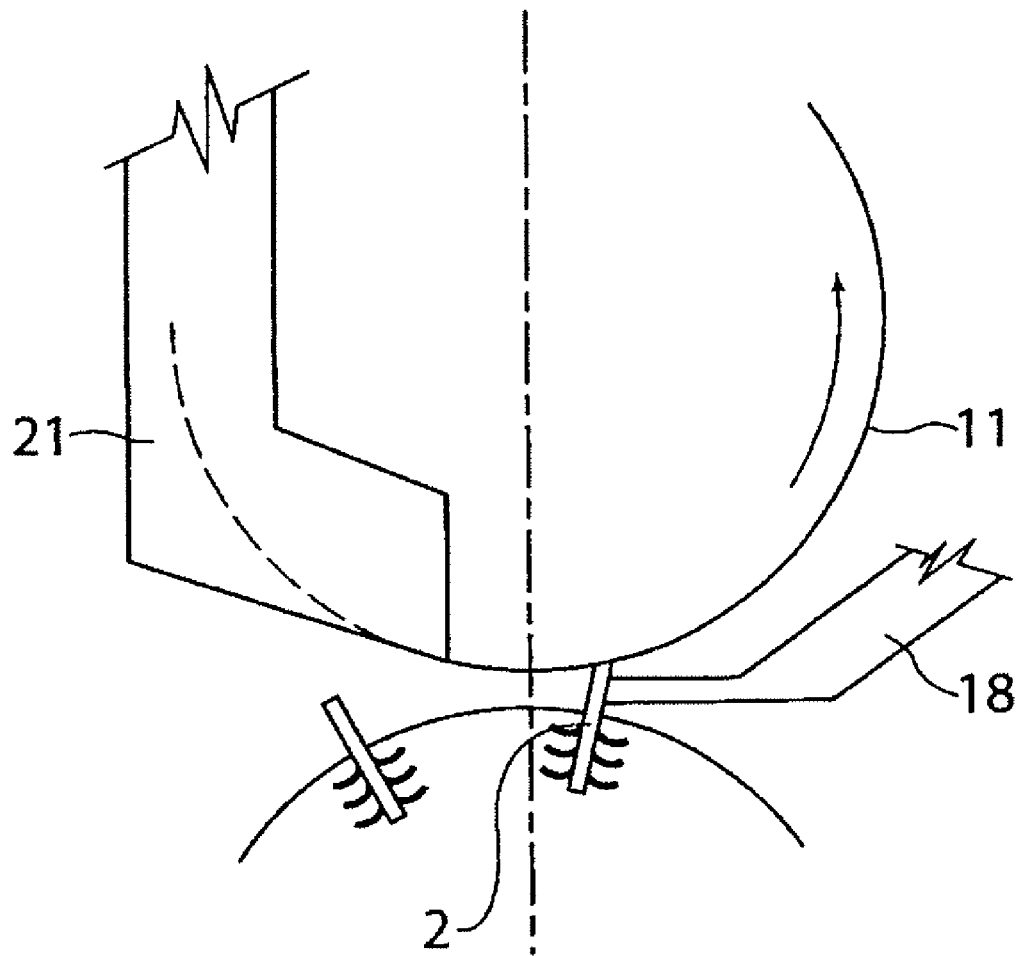
FIG. 2 shows a schematic representation of the operative engagement between the grinding disc and the helical cutting blade.

Referring to FIG. 2, the operative engagement between the grinding wheel 11 and the helical blade 2 is shown in detail. The blade 2 is urged against the positioning finger 18 so that the peripheral edge of the grinding wheel 11 cuts the required relief angle. As a further precaution, a safety catch 21 provides a guard to prevent the next helical blade 2 from unintentionally contacting the grinding wheel 11. The tool carriage 13 is slid down the track defined by the side rails 14 and 15 to cut the relief angle into the length of the helical blade 2.

The positioning finger 18 has two positions, one for grinding the relief angle and the other for grinding the land, as discussed in more detail below.

Two adjustable carriage stops 22 are clamped to the frame 6 so as to define the limit of travel for the carriage 13 along the rails 14 and 15 and to prevent the grinding wheel 11 disengaging from the blade 2. When the grinding wheel 11 needs to be disengaged from the blade 2, the operator manually lifts the carriage stops 22 into an upright position to allow the carriage 13 to move back past its normal limit of travel. With the grinding wheel 11 and the safety catch 21 out of the way, the reel 1 is then rotated to index the next blade 2 into abutment with the positioning finger 18. The ratcheted weight 19 is then rotated relative to the next blade 2 to reapply the biasing torque and keep the blade in contact with the positioning finger 18.

Left and right hand helical blades can be accommodated by the apparatus, by turning the workpiece with the assistance of the stops 4 and by holding the reel 1 in the indexed position and lifting the ratcheted weight 19.

The grinding wheel 11 is then brought back into operational engagement with the blade 2 and the hinge carriage stops 22 is located to limit the travel of the carriage 13. The carriage stops 22 are in their operative positions during machining when the stops 22 automatically drop into their positions as the carriage 13 is brought into engagement with the reel blade 2.

When all the blades 2 have been relief ground, the positioning finger 18 is extended to bring the cutting edge of the reel blade 2 in line with the same line as the reel axle 3 and the grinding wheel 11. A light cut is taken off each blade to form a land of approximately 1 mm.

After all the reel blades have been ground with the relief angle and the land, the cylindrical mower assembly is repositioned on the adjustable supports 5. As the adjustable supports 5 remain fixed, the bedknife support 28, which is still in situ, is in the same position as relative to the frame as the reel 1, occupying the same plane as the side rails 14 and 15. The grinding wheel 11 is then indexed at 90 degrees to its previous orientation and a light grinding cut is taken over the bedknife support 28 to precisely match the bedknife support 28 to the reel blades 2. The reel 1 including the bedknife support 28 is then removed from the frame 6.

Figure 3:
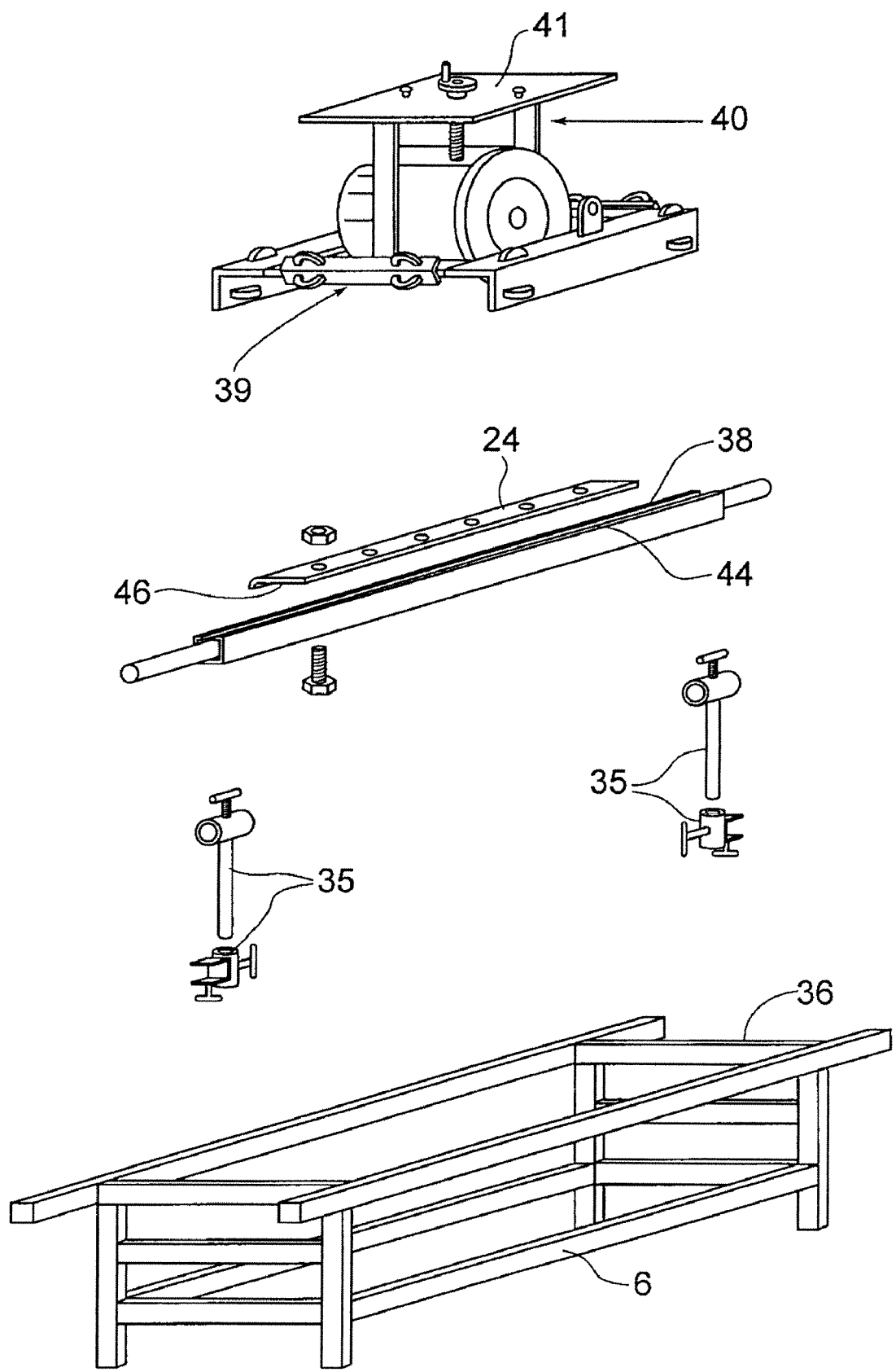
FIG. 3 shows the apparatus of FIG. 1 configured to machine the bedknife of a mower reel assembly.
Figure 4:
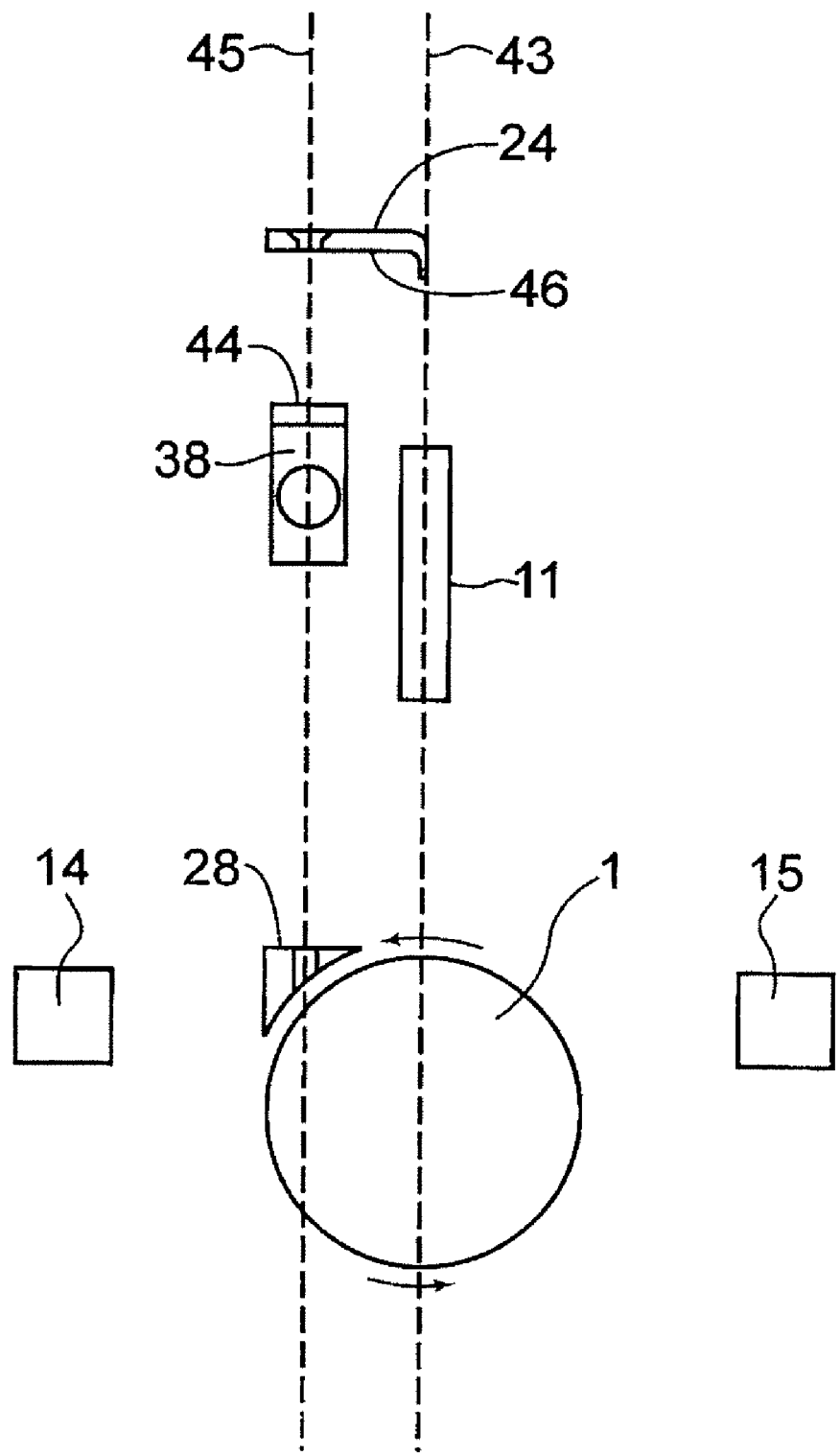
FIG. 4 shows an exploded end view of the apparatus of FIG. 3.

The bedknife 24 is then mounted into position on the frame 6, as best shown in FIGS. 3 and 4. In this embodiment, the apparatus has another set of adjustable supports 35 in the form of clamping assemblies, which are positioned on the centre of the transverse members 36 of the frame 6, so that a support member 38 is located parallel to the side rails 14 and 15 for supporting the bedknife 24 such that the bedknife 24 is located in the centre line 43 of the reel 1. This is effected by clamping an indicator (not shown) to the tool carriage 13 and checking the height of the support member 38 along the machined edge. The clamping assemblies 35 are adjustable to enable the bedknife 24 to lie in the path of defined relative movement between the grinding tool 12 and the frame 6.

The face 44 of the support member 38 may also be ground under the grinding wheel 11 to match the centre line between the rails 14 and 15. That is, the support member 38 is ground on the centre line 45 of the bedknife support 28. Similarly, the face 46 of the bedknife 24 may be ground over the grinding wheel 11 to match the reel 1 and the bedknife support 28.

Figure 5:
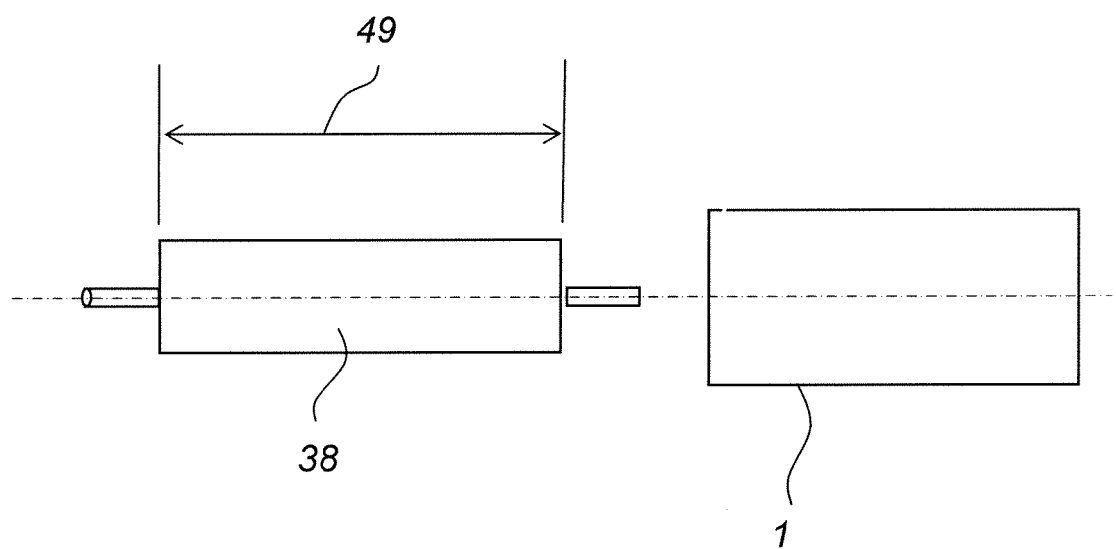
FIG. 5 shows a schematic representation of the matched grinding path.

The grinding wheel 11 has been left in the same indexed orientation as it was when the bedknife support 28 was ground. This limited distance defined by the sides 39 of the carriage 13 is sufficient for grinding the bedknife 24 and bedknife support 28. The bedknife 24 is then clamped to the support member 38 by way of the clamping assemblies 35 so that the bedknife 24 is located upside down on the same face 46 that contacts the bedknife support 28 when it is assembled. The bedknife 24 is positioned so that it lies in the space 40 between the grinder wheel 11 and the top 41 of the tool carriage 13 as the tool 12 travels along the path of defined relative movement. The bedknife 24 is then sharpened from the underside by passing the grinder 12 along the bedknife 24. The tool carriage 13 travels along the same path 49 as the defined relative movement for machining the blades 2 and the bedknife support 28, and the bedknife 24 is held at the same position relative to the frame 6 as the reel 1 by the clamping assemblies 35, as best shown in FIG. 5 (where the grinding path 49 has been exaggerated for visual reasons). Consequently, this grinds the same profile on the bedknife 24 as the profile of the rear bedknife support 28 so that when the bedknife 24, bedknife support 28 and the helical blades 2 are assembled into the mower wheel assembly, they precisely match. As shown in the Figures, this is accomplished because the workpieces are in a substantially horizontal position. As a further precaution against excessive deflection, the line of engagement between the grinding disc 11 and the workpiece, (be it the helical blades 2, bedknife support 28 or the bedknife 24) is kept along the centre line of the frame 6 in order to minimise the effects of any twist or warping.

By using the realisation that the helical blades of the reel, the bedknife support and the bedknife do not require precision machining such that there are no deflections, but rather such that they are machined to precisely match each other, the cost of the machining equipment is reduced and it is possible to make the equipment portable for convenient on site machining. It is not only saves transport costs but minimises equipment downtime. A further advantage is that the apparatus replaces at least two other machines to grind the blades, bedknife and bedknife support of the reel assembly.

In other embodiments, the bedknife 24 can be mounted to the adjustable supports 5 for machining along the path of defined relative movement. However, this would require positioning the bedknife 24 to face in the opposite direction as described above.

The present invention has been described herein by way of example only. The skilled workers in this field will readily recognise many variations and modifications which do not depart from the spirit and scope of the broad inventive concept.

I claim:

1. A method of machining workpieces that, when in use, functionally cooperate with each other, wherein the machining method is performed with one of the workpieces being an elongate cylinder with a series of helically wound cutting blades and a bedknife support and with one of the workpieces being a bedknife, the method including:
    (a) providing a grinding assembly having a frame;
    (b) mounting one of the workpieces on the frame;
    (c) mounting a machining tool on the frame to permit defined relative movement between the tool and the frame;
    (d) adjusting the position of the workpiece relative to the frame with one or more adjustable supports for the machine tool to operatively engage the workpiece;
    (e) fixing the adjustable supports to maintain the position of said workpiece relative to the frame;
    (f) operatively engaging the tool and the workpiece and machining the workpiece in accordance with the defined relative movement,
    (g) removing the workpiece from the frame, and
    (h) mounting the other one of the workpieces on the frame and repeating steps (c)-(g) on the second mounted workpiece,
    wherein said elongate cylinder and said bedknife functionally cooperate to cut grass, and wherein said elongate cylinder and said bedknife form a single lawn mower assembly.

2. The method of claim 1, wherein the adjustable supports are fixed in position during the removing step.

3. The method of claim 1, further including the step of machining a relief angle into the back of the helically wound cutting blades.

4. The method of claim 1, further comprising the step of machining substantially the entire length of the bedknife and the helically wound blades.

5. The method of claim 1, wherein the elongate cylinder is initially mounted on the frame for machining and is subsequently removed, and the bedknife is then mounted on the frame for machining.

6. The method of claim 1, wherein matching surfaces are formed on said helically wound cutting blades and said bedknife for functional cooperation in use.

7. The method of claim 1, further comprising the steps of:
    mounting the elongate cylinder to the frame by said adjustable supports so that the elongate cylinder is positioned to a first side of the machining tool and the machining tool operatively engages one of said cutting blades;
    moving the machining tool along its path of defined relative movement with respect to the frame so as to sharpen the cutting blade;
    rotating the machining tool so that the machining tool operatively engages a further cutting blade of the elongate cylinder and again moving the machining tool along its path of defined relative movement to sharpen any such further cutting blade; and
    removing the elongate cylinder from the frame after sharpening.

8. The method of claim 7, further comprising the steps of:
    mounting the bedknife to the frame so that the bedknife is positioned to a second side of the the machining tool opposite the first side and the machining tool operatively engages said bedknife; and
    removing the bedknife from the frame after sharpening.

9. The method of claim 8, wherein the orientation of the axis of rotation of the machining tool is parallel to the direction of movement of the machining tool along its path of defined relative movement with respect to the frame when the machining tool operatively engages a cutting blade of the elongate cylinder, and wherein the orientation of the axis of rotation of the machining tool is perpendicular to the direction of movement of the machining tool along its path of defined relative movement with respect to the frame when the machining tool engages the bedknife.

10. The method of claim 7, further comprising the steps of:
    removing said bedknife from said single lawn mower assembly prior to mounting said elongate cylinder to said frame by said adjustable supports.

11. The method of claim 1, further comprising the steps of:
    removing said bedknife from said single lawn mower assembly prior to mounting said elongate cylinder on said frame.

12. The method of claims 1, further comprising the steps of:
    mounting the bedknife to the frame so that the bedknife is positioned to a second side of the the machining tool opposite a first side and the machining tool operatively engages said bedknife; and
    removing the bedknife from the frame after sharpening.

* * * * *

UNITED STATES PATENT AND TRADEMARK OFFICE
CERTIFICATE OF CORRECTION

PATENT NO. : 8,287,332 B2  Page 1 of 1
APPLICATION NO. : 11/946669
DATED : October 16, 2012
INVENTOR(S) : Mayfield It is certified that error appears in the above-identified patent and that said Letters Patent is hereby corrected as shown below:

*In The Claims*

In Column 7, Line 64, in Claim 1, delete "movement," and insert -- movement; --, therefor.

In Column 7, Line 65, in Claim 1, delete "frame," and insert -- frame; --, therefor.

In Column 8, Line 29, in Claim 7, delete the first instance of "machining tool" and insert -- elongate cylinder --, therefor.

In Column 8, Line 37, in Claim 8, delete "the the" and insert -- the --, therefor.

In Column 8, Line 58, in Claim 12, delete "claims 1," and insert -- claim 1, --, therefor.

In Column 8, Line 61, in Claim 12, delete "the the" and insert -- the --, therefor.

Signed and Sealed this
Sixteenth Day of December, 2014

Michelle K. Lee
*Deputy Director of the United States Patent and Trademark Office*